United States Patent [19]

Beale et al.

[11] 4,140,842
[45] Feb. 20, 1979

[54] PHENOLIC FOAM AND SURFACTANT USEFUL THEREIN

[75] Inventors: John H. Beale, Dedham, Mass.; Ernest K. Moss, St. Petersburg, Fla.

[73] Assignee: The Celotex Corporation, Tampa, Fla.

[21] Appl. No.: 837,875

[22] Filed: Sep. 29, 1977

[51] Int. Cl.² .............................................. C08J 9/14
[52] U.S. Cl. .................................... 521/129; 252/356; 428/310; 521/94; 521/181; 528/155
[58] Field of Search ..................... 260/2.5 F; 521/129, 521/181

[56] References Cited

U.S. PATENT DOCUMENTS

| 3,876,620 | 4/1975 | Moss | 260/2.5 F |
| 4,036,793 | 7/1977 | Moss | 260/2.5 F |

*Primary Examiner*—Morton Foelak
*Attorney, Agent, or Firm*—Littlepage, Quaintance, Murphy, Richardson and Webner

[57] ABSTRACT

A closed cell phenolic-resin foam material comprising phenolic-resin foam forming reactants, a blowing agent, and a surfactant which is the capped reaction product of an alkoxylated amine and a copolymerizable mixture of dialkyl maleate with N-vinyl-2-pyrrolidone or N-vinyl caprolactam.

15 Claims, 10 Drawing Figures

FIG. I
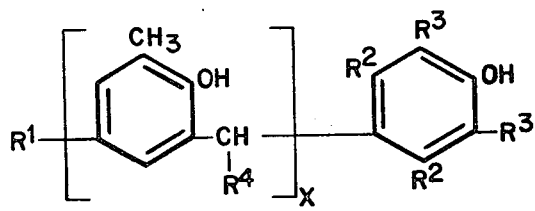
FIG. II
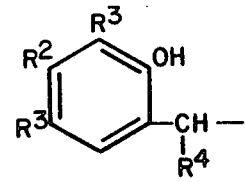
FIG. III
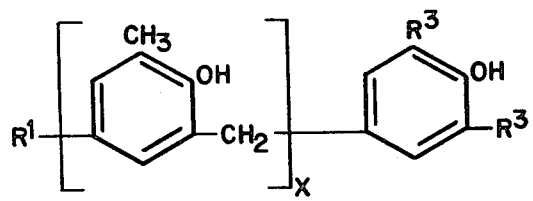
FIG. IV
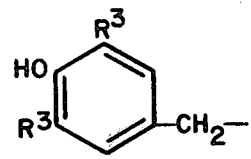
FIG. V
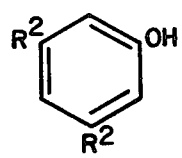
FIG. VI
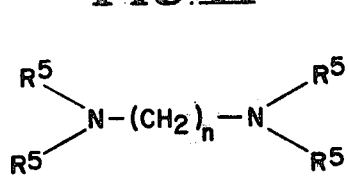
FIG. VII
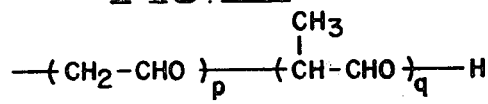
FIG. VIII
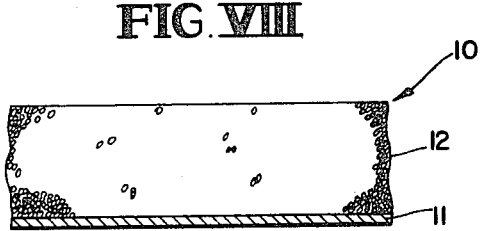
FIG. IX
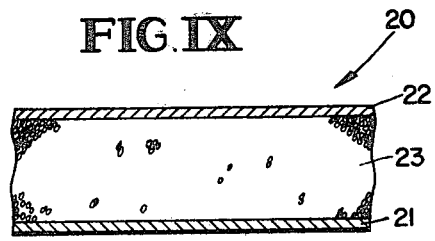

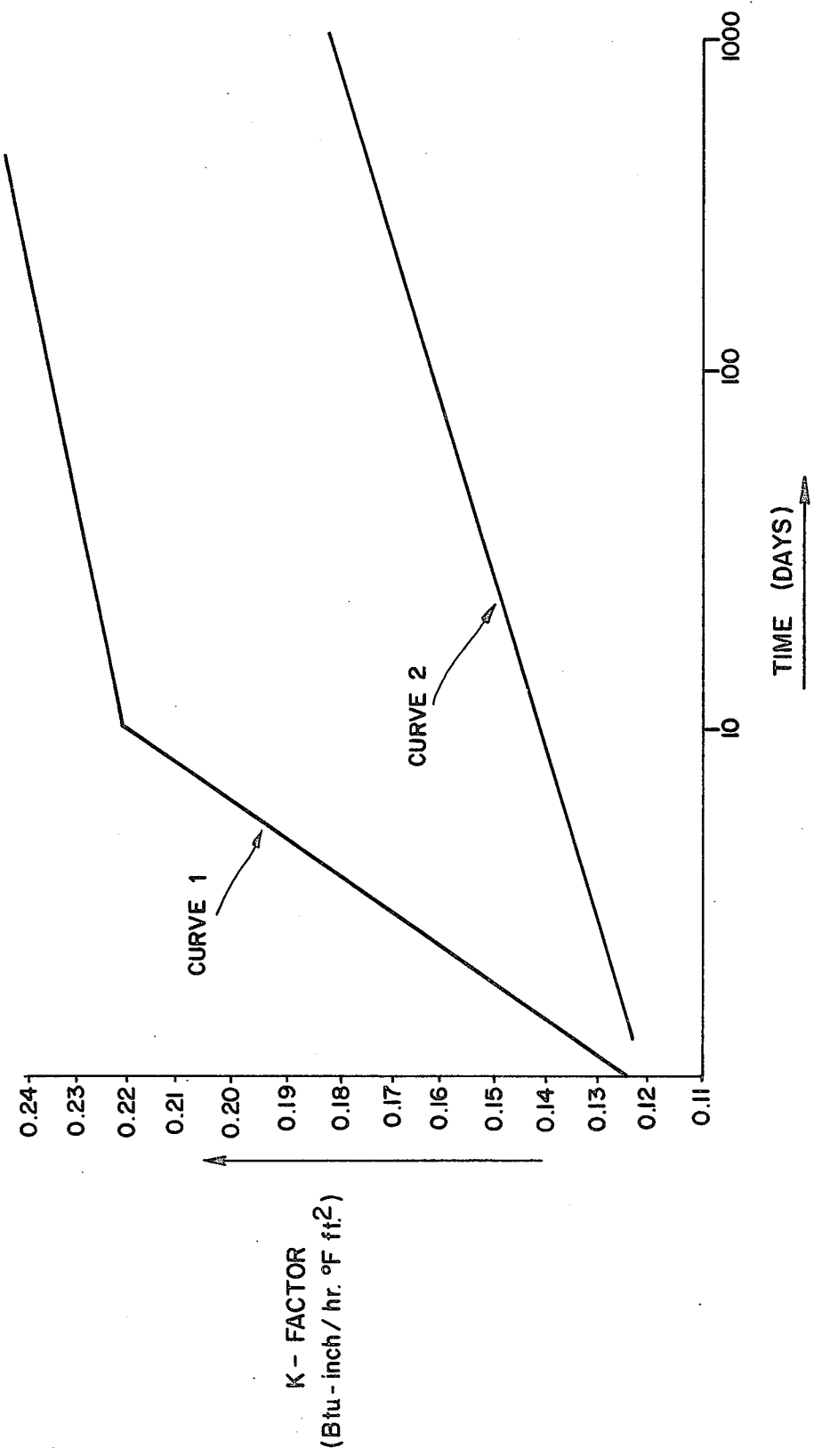

PHENOLIC FOAM AND SURFACTANT USEFUL THEREIN

Phenolic polymers have been known for decades. More recently, there has been increased interest in phenolic polymers which can be formed into cellular materials more commonly referred to as foams. These foams are produced by mixing reactants in the presence of a blowing agent. See for example Thomas et al. U.S. Pat. No. 2,744,875 (1956); Nelson Canadian Pat. No. 674,181 (1963); Dijkstra Canadian Pat. No. 684,388 (1964); Wissenfels et al. Canadian Pat. No. 866,876 (1971); United Kingdom Specification No. 598,642 (1948); Australian Pat. No. 128,508 (1945); and Modern Plastics Encyclopedia Volume 53, No. 10a, page 479 (1977). However, most known cellular materials produced from phenolic polymers exhibit an unsatisfactory thermal conductivity initially. Other known cellular materials produced from phenolic polymers exhibit an undesirable increase in thermal conductivity with time.

Accordingly, it is an object of the present invention to provide an improved closed cell phenolic-resin foam material substantially free of the disadvantages of prior foams.

Another object is to provide an improved process for producing improved cellular materials employing an improved phenolic polymer, and an improved laminated building panel employing the improved closed cell phenolic-resin foam material.

A still further object is to provide an improved closed cell phenolic-resin foam material which exhibits a high closed cell content without adversely affecting friability, compressive strength and the low flammability characteristics of the material.

Yet another object is to produce a closed cell phenolic-resin foam material with high thermal resistance and high insulation properties and a substantially slow increase in thermal conductivity with time.

A further object is to produce a closed cell phenolic-resin foam material which can be used as building panels which are highly insulating, thermally resistant, low in friability, soundproof and self-supporting.

Additional objects and advantages of the present invention will be apparent to those skilled in the art by reference to the following detailed description and drawings wherein:

FIG. I is Formula I;
FIG. II is Formula II;
FIG. III is Formula III;
FIG. IV is Formula IV;
FIG. V is Formula V; FIG. VI is Formula VI;
FIG. VII is Formula VII;
FIG. VIII is a cross-sectional view of a laminated building panel having one facing sheet;
FIG. IX is a cross-sectional view of a laminated building panel having two facing sheets;
FIG. X is a graph showing the relationship between k-factor and time for foams of the present invention.

According to the present invention, there is provided a closed-cell cellular composition comprising a phenolic resin, blowing agent and a surfactant having hydroxyl number of less than 50 preferably less than 10 by reaction with a capping agent. The process of capping functional groups is well known and common agents for masking the functionality of the hydroxyl group are agents which produce esters, urethanes, and ethers. Phenolic resin foams are a well known class, phenolaldehyde resin foams being representative and proportions of blowing agent, catalyst and components are well known in the art.

Foams of low friability can be obtained by using a preferred phenolic polymer described in Moss U.S. Pat. No. 3,876,620. The preferred phenolic polymer is an alkylol group containing phenolic polymer of Formula I shown in FIG. I of the drawings wherein $R^1$ is

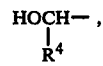

hydrogen, or a radical of Formula II.

The $R^2$'s are independently selected from the group consisting of lower alkyl, phenyl, benzyl, halo, nitro, and hydrogen. The $R^3$'s are independently selected from the group consisting of

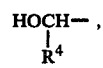

hydrogen, or a radical of Formula II, shown in FIG. II.

The $R^4$'s are independently selected from the group consisting of lower alkyl, hydrogen, phenyl, benzyl, or furyl. By furyl is meant the radical introduced by the use of furfural. In Formula I, x is an integer from 2 to 10 inclusive and is preferably an integer from 2 to 6 inclusive. When x is less than 2, a foam produced from such a phenolic polymer tends to have too high a friability. On the other hand, as x exceeds 10, the viscosity of the polymer increases to the point where it is difficult to produce the foam. The phenolic polymers of the present invention generally have a molecular weight between 200 and 2,000 and preferably have a molecular weight between 300 and 1,500. At lower molecular weights, the resultant foams tend to have too high a friability, whereas at high molecular weights the viscosity of the phenolic polymer, even when a solvent is present, tends to be too high to permit processing.

A preferred subclass of phenolic polymers are those of Formula III, shown in FIG. III.

In Formula III, $R^1$ is $HOCH_2-$, hydrogen, or a radical of Formula IV.

The $R^3$'s are independently selected from the group consisting of $HOCH_2-$, hydrogen, or a radical of Formula IV, shown in FIG. IV.

In a preferred embodiment of the present invention, at least one of the $R^3$'s is methylol, i.e., $HOCH_2-$. This is to ensure that there will be cross-linking sites on the phenolic polymer. Of course, such methylol groups or, when the aldehyde is other than formaldehyde, alkylol groups, are automatically introduced into the polymer as is well-known in the art by the process described below.

In the broadest aspects of the present invention, the phenolic polymer can contain widely varying ratios of the radicals of Formula II or IV to ortho-cresol units. However, this ratio is generally from 1:3 to 10:1 and is preferably from 1:1.5 to 5:1. At higher ratios, i.e., a deficiency of ortho-cresol, the cellular material produced from such a phenolic polymer tends to be too friable. In determining the above ratios, one must include the radicals of Formula II or IV present in Formula I or III respectively. The synthesis of phenolic polymers of Formulae I through IV is described and claimed in Moss U.S. Pat. No. 3,876,620. These phenolic compositions useful in the present invention generally comprise the phenolic polymer of Formula I or Formula III, together with a compound of Formula V.

The compound of Formula V can be present in the phenolic composition in widely varying ratios of Compound V to polymeric composition but is generally present in a weight ratio of 1:30 to 1:2 and is preferably present in a weight ratio of 1:20 to 1:5. Examples of suitable compounds of Formula V include among others: m-cresol, m-chlorophenol, m-nitrophenol, 3,5-xylenol, and phenol, i.e., hydroxy benzene. Phenol is the most preferred compound of Formula V because of cost, availability, and reactivity. The phenolic polymers of Formula I and Formula III are produced according to the present invention by combining certain reactants in a two-step process described in Moss, supra.

In the broadest aspects of the present invention, any aldehyde can be employed to produce useful phenolic polymers. Examples of suitable aldehydes include among others furfural, formaldehyde, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material of the present invention is formed by simply reacting the alkylol group containing phenolic polymer of Formula I or Formula III and the compound of Formula V under conditions such that a cellular product will result. As is well known in the phenolic foam art, the reaction can be conducted in the presence of a foaming catalyst, a blowing agent, and a surfactant. The reaction can be performed between temperatures of 10°–50° C., preferably 15°–25° C., and conveniently at atmospheric pressure. The cellular materials of the present invention generally have a thermal conductivity, k-factor value, of from 0.1 to 0.3 and preferably from 0.1 to 0.2 Btu/hr-° F.-sq. ft. per inch as measured at 24° C. The k-factor value is measured on a Model 88 machine supplied by the ANACON Company. The friability of the cellular material is 20% or less. Friability is the propensity of the foam to break expressed in percent weight loss. This is determined by the ASTM C-421 friability test conducted for 10 minutes.

In the broadest aspects of the present invention, any catalyst which will enhance the cross-linking and foaming reaction can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid as described in Mausner et al U.S. Pat. No. 3,458,449. Another foaming catalyst which has been found to give excellent results is a blend of toluene sulfonic acid, phosphoric acid, and water in a weight ratio of 35–50:50–35:15.

The catalyst is generally present in the minimum amount that will give the desired cream time of 10 to 50 seconds and firm time of 40 to 500 seconds to the reacting mixture. The catalyst, however, generally comprises from 0.5 to 20, and preferably comprises from 1.0 to 15, weight percent based on the weight of the cellular material.

Any blowing agent characteristically employed in similar prior art products such as is described in Moss et al, U.S. Pat. No. 3,968,300, can be employed in the composition of the present invention. In general, these blowing agents are liquids having an atmospheric pressure boiling point between minus 50 and 100° C. and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethyl ether, isopropyl ether, n-pentane, cyclopentane, and 2-methylbutane. Combinations of trichlorofluoromethane plus 1,1,2-trichloro, 1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

In the broadest aspects of the instant invention, any hydroxyl containing cell stabilizing surfactant with a branched, non-ionic structure conventionally used in producing polymeric foams can successfully be used after capping the hydroxyl groups. By cell stabilizing surfactant is meant one which keeps a foam from collapsing and rupturing. Typical surfactants have hydroxyl numbers in the range of 60 to 100. In other words, any branched conventional surfactant whose hydroxyl number is reduced to a value of less than 50, preferably less than 10, by reaction with a suitable capping agent such as organic acid, acid anhydride, acid chloride, acyloxy chloride and alkyl or aryl isocyanate is a suitable surfactant. Alcohols can be converted to ethers but this generally does not result in a surfactant that behaves as a cell stabilizer. The hydroxyl number is determined by the ASTM-D1638 test.

The preferred surfactant is the capped reaction product of an alkoxylated amine of Formula VI shown as FIG. 6 wherein $R^5$ is an alkoxylated chain of Formula VII, n is an integer from 2 to 10 inclusive and the ratio p:q is 15:85 to 85:15, which amine has been reacted with a copolymerizable mixture of dialkyl maleate and a member selected from the group consisting of N-vinyl-2-pyrrolidone and N-vinyl caprolactam, the alkyl of the maleate having 1 to 5 carbon atoms. The preferred dialkyl maleate is dibutyl maleate.

The alkoxylation is carried out using a mixture of ethylene oxide and propylene oxide in the ratio of 15:85 to 85:15 and preferably from 20:80 to 60:40. The molecular weight of the alkoxylated amine is from 1500 to 6000 and preferably from 1800 to 2800. If the molecular weight of the alkoxylated amine is less than 1500, the resultant foam collapses. An alkoxylated amine of molecular weight higher than 6000 is too viscous to be practicable.

The preferred molar ratio of dibutyl maleate and N-vinyl-2-pyrrolidone is 1:1, the mixture of dibutyl maleate and N-vinyl-2-pyrrolidone comprising between 5 and 40 weight percent of the reaction mixture, and preferably 20 weight percent of the reaction mixture. If less than 5 percent is used, the surfactant is ineffective, if more than 40 percent is used, the foam collapses. N-vinyl2-pyrrolidone and N-vinyl caprolactam are interchangeable in equivalent quantities, but N-vinyl-2-pyrrolidone is preferred.

The capping reaction is carried out with a capping agent. Suitable capping agents include a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly aromatic acids, anhydrides and chlorides can be employed. Benzoyl chloride and substituted products of it such as 3,5-dinitrobenzoyl chloride are examples of these. Alkyl and aromatic isocyanates can also be employed. Other factors such as solubility in the surfactant and the solubility of the capped surfactant with a particular phenolic-resin are considerations of which a practitioner in the art is cognizant in selecting the system which will yield the desired closed cell stabilized foam. Examples of suitable capping agents are acetic acid, acetic anhydride, acetyl chloride and 3,5-dinitrobenzoyl chloride, reacted so that the surfactant has a hydroxyl value of less than 50, and preferably less than 10. The preferred capping agent is acetic anhydride.

The preferred surfactants useful in the present invention produce a uniform fine-celled foam. Uniformity of cells is determined by visual and microscopic examination. The surfactants must produce a fine celled foam. This property is tested by mixing 2 to 5% of the surfactant with the phenolic composition and producing a foam as described herein. It is interesting to note that a low surface tension of the surfactant in the phenolic-resin is not a prerequisite to obtaining a good foam.

The average cell size diameter must be less than 0.2 mm and is preferably less than 0.1 mm (ASTM D-2842). Fine celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is redetermined at various time intervals up to about 1000 days. A material exhibiting fast k-drift will attain a k-factor (Btu/hr-° F.-ft$^2$ per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or a lower value is maintained, the better the efficiency of the insulation.

Ball, Hurd and Walker have published a comprehensive discussion of k-factor changes as a function of time. ("The Thermal Conductivity of Rigid Urethane Foams", J. Cellular Plastics, March/April, 1970, pp 66-78.) F. Norton ("Thermal Conductivity and Life of Polymer Foams", J. Cellular Plastics, January, 1967, pp 23-37) has shown that diffusion of fluorocarbon gases out of unfaced foam and infusion of air into the foam causes an increase in k-factor. A slow k-drift foam is defined as one that attains a k-factor at 24° C. of 0.15–0.17 after 200–400 days and then remains below 0.2 k-factor for 5–10 years. Eventually all fluorocarbon diffuses from the foam to leave a closed cell material which contains only air in the cells.

The k-factor for the closed cell foam containing only air falls in the range of 0.22–0.26 Btu/hr-° F.-ft$^2$ per inch thickness at 24° C. for the 2–3 lbs/ft$^3$ density range. Therefore, if a foam exhibits greater than 0.2 k-factor after a short period of time (less than 25 days), then substantially all fluorocarbon has diffused from the foam and has been replaced by air. On the other hand, if k-factor remains below 0.2 for at least 100 days then a substantial amount of fluorocarbon gas remains in the closed cells of the foam in spite of infusion of air.

It has been found that capping the surfactant that yields a fine celled foam increases the closed cell content and the initial k-factor is lowered.

Moreover, capping and grafting the surfactant yield a fine celled foam with high closed cell content, a low initial k-factor and a low k-drift value.

The surfactant is employed in a cell stabilizing amount. Generally the surfactant comprises from 0.05 to 10, and preferably comprises from 0.1 to 6, weight percent of the composition. Too little surfactant fails to stabilize the foam and too much surfactant is not only wasteful, but also for surfactants having relatively high surface tension (about 35 dynes/cm) may lead to larger cell structure by cell coalescence and the foam may collapse. Branched, non-ionic, capped, grafted surfactants are preferred.

As used herein any of the alkyl, aryl, aralkyl, and/or alkaryl groups can be substituted with one or more groups that do not materially affect the physical or chemical properties of the surfactant compound. Examples of substituents include, among others, —F, —Cl, —Br, —CH$_3$, and —NO$_2$.

Referring now to the drawings, and in particular to FIG. VIII, there is shown a laminated building panel 10 of the present invention. The building panel 10 comprises a single facing sheet 11 having thereon a cellular material 12 of the present invention. FIG. IX shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

The invention is further illustrated by the following examples in which all parts and percentages are by weight unless otherwise indicated. These non-limiting examples are illustrative of certan embodiments designed to teach those skilled in the art how to practice the invention and to represent the best mode contemplated for carrying out the invention.

EXAMPLE 1

This example illustrates the synthesis of a phenolic polymer of Formula I useful in the present invention employing a molar ratio of phenol to o-cresol of 2:1.

| Item | Ingredient | Amount grams | moles |
|---|---|---|---|
| A | o-cresol | 10,580 | 98 |
| B | paraformaldehyde (93.6%) | 4,743 | 148 |
| C | sodium hydroxide (50%) | 295 | 3.69 |
| D | phenol | 18,428 | 196 |

-continued

| Item | Ingredient | Amount grams | moles |
|---|---|---|---|
| E | paraformaldehyde | 7,917 | 247 |
| F | glacial acetic acid | 225 | 3.75 |

Items A and B are charged to a reaction vessel. Item C is added over a period of fifteen minutes, the temperature rises to 100° C. due to an exothermic reaction and is maintained at that level for 1 hour. Items D and E are then added and the temperature maintained at 80° C. for four and one-half hours. Item F is then added and the contents of the reaction are termed Resin B.

Resin B has a viscosity at 25° C. of 29,500 cps, a free phenol content of 8.1%, and a free water content of 9.1%, a free formaldehyde content of 0.6%, and a free o-cresol content of less than 0.1%.

EXAMPLE 2

This example illustrates the synthesis of a phenolic polymer of Formula I useful in the present invention employing a molar ratio of phenol to ortho cresol of 4:1.

The following quantities of the following ingredients are combined as indicated.

| Item | Ingredient | Amount grams | moles |
|---|---|---|---|
| A | o-cresol | 6,901 | 63.9 |
| B | paraformaldehyde (93.5% HCHO) | 3,133 | 97.7 |
| C | sodium hydroxide (50% NaOH) | 215 | 2.69 |
| D | phenol | 24,025 | 255.5 |
| E | paraformaldehyde | 11,350 | 354.1 |
| F | sodium hydroxide (50% NaOH) | 215 | 2.69 |
| G | glacial acetic acid | 350 | 5.8 |

Items A and B are charged to a reaction vessel. Item C is added over a period of fifteen minutes, the temperature rises due to the exothermic reaction, to 100° C. and is maintained at that level for 1.5 hours. Items D, E, and F are then added and temperature maintained at 80° C. for 5 hours. Item G is then added and the contents of the reaction vessel is termed Resin C.

Resin C has a viscosity at 25° C. of 24,300 cps, a free phenol content of 8.6%, and a free water content of 10.0%, a free formaldehyde content of 2.3%, and a free o-cresol content of less than 0.1%.

EXAMPLE 3

This example illustrates the synthesis of a surfactant precursor.

| Item | Ingredient | Amount grams | moles |
|---|---|---|---|
| A | ethoxylated propoxylated ethylene diamine (Tetronic 704) | 800 | (0.31) |
| B | N-vinyl-2-pyrrolidone | 64 | 0.577 |
| C | dibutyl maleate | 136 | 0.596 |
| D | azo-bis-isobutyronitrile | 4.0 | 0.02439 |
| E | t-butylperbenzoate | 2.0 | 0.01031 |

Item A is placed in a reaction vessel at 90° C. Item B is placed in a dropping funnel. Items C, D, and E are mixed together and placed in a second dropping funnel. The contents of the two dropping funnels are each concurrently added to the reaction vessel over a period of one hour while maintaining the temperature at 90° C. The temperature is raised to 140° C. for an additional hour to produce a surfactant precursor.

Item A has a molecular weight of 2600, has a weight ratio of ethylene oxide to propylene oxide of 40:60, and is available from the BASF Wyandotte Corporation, Wyandotte, Michigan, U.S.A., under the tradename "TETRONIC 704".

EXAMPLE 4

This example illustrates the capping of surfactants useful in the present invention.

| Item | Ingredient | Amount grams | moles |
|---|---|---|---|
| A | surfactant precursor from Example 3 | 400 | 0.154 |
| B | acetic anhydride | 30 | 0.294 |

Items A and B are mixed together at room temperature and heated to 100° C. for two hours to produce a surfactant useful in the present invention termed Surfactant A.

EXAMPLE 5

This example illustrates the synthesis of foaming catalysts useful in the present invention.

The following quantities of the following ingredients are combined as indicated to produce Catalyst A:

| Ingredients Item | Name | Quantity grams |
|---|---|---|
| A | p-toluene sulfonic acid | 333 |
| B | xylene sulfonic acids | 333 |
| C | water | 333 |

Items A, B, and C are mixed. The resultant composition is termed Catalyst A.

The following quantities of the following ingredients are combined as indicated to produce Catalyst B:

| Ingredients Item | Name | Quantity grams |
|---|---|---|
| A | Ultra TX | 667 |
| B | water | 333 |

Items A and B are mixed. The resultant composition is termed Catalyst B. Ultra TX is a mixture of equal parts by weight of p-toluene sulfonic acid and xylene sulfonic acids available from the Witco Chemical Company.

EXAMPLE 6

This example illustrates the synthesis of a foam based on 2:1 phenol:o-cresol resoles of the present invention.

| Item | Ingredient | grams |
|---|---|---|
| A | Resin B | 300 |
| B | $CFCl_3$ | 22.5 |
| C | $CCl_2FCF_2Cl$ | 22.5 |
| D | Surfactant A of Example 4 | 15 |
| E | Catalyst B | 40 |

Items A through E are mixed in an open vessel for 15 seconds. The mixture is then poured into a square paper box twelve inches by twelve inches by five inches tall. A foaming reaction ensues. After a period of about 240–300 seconds the material is rigid. The box and contents are placed in an oven at 55° to 75° C. for a period of ten minutes to one hour.

EXAMPLES 7-12

The procedure of Example 6 is repeated using different surfactants. The characteristics of the surfactant and the resultant foam are shown in Table I.

The "TETRONIC" series of alkoxylated amines are available from BASF Wyandotte Corp., Wyandotte, Michigan 48192.

Compressive strength is measured according to ASTM D-1621.

Oxygen Index Value is measured according to ASTM D-2863-74.

A typical resultant foam has the following properties:

| | |
|---|---|
| Density | 2.4 lbs/ft$^3$ |
| Thermal Conductivity | 0.120 BTU/hr-° F-ft$^2$ per inch |
| Friability | 12% |
| Compressive Strength | 30 psi |
| Oxygen Index Value | 34 |

FIG. X shows a plot of k-factor versus log time. The k-values are plotted on the y-axis (linear scale) and the time in days is plotted on the x-axis (log scale) as described by Ball, Hurd and Walker, supra.

Fast k-drift materials attain greater than 0.2 k-factors rapidly as shown by curve 1 which are typically represented by Example 8 of Table I. After the k-factor reaches a value of 0.22 the rate of increase slows, tangentially approaching about 0.26.

Slow k-drift materials attain less than 0.2 k-values at 1000 days as shown by curve 2 in FIG. X, which are typically represented by Example 6 of Table I.

It is to be emphasized that these k-values are for 1" thick unfaced (unlaminated) foam boards. Laminated products have superior properties dependent on the permeability of the laminating material and the total surface-exposed edge proportions.

TABLE I
PROPERTIES OF PHENOLIC FOAMS MADE WITH 2:1 PHENOL:O-CRESOL BASED RESINS

| 1 Example (No.) | 2 Alkoxylated Amine | 3 Copolymer Level (Wt. %) | 4 Ratio p:q | 5 Density (lb/ft$^3$) | 6 Initial k (Btu/hr-° F-ft$^2$ per inch) | 7 k drift dK dLogt ($\times 10^3$) |
|---|---|---|---|---|---|---|
| 6 | Tetronic 704 | 20 | 40:60 | 2.4 | 0.120 | 6 |
| 7 | Tetronic 702 | 20 | 20:80 | 2.3 | 0.128 | 5 |
| 8 | Tetronic 504 | 20 | 40:60 | 2.3 | 0.144 | 30 |
| 9 | Tetronic 702 | 30 | 20:80 | 2.3 | 0.128 | 9 |
| 10 | Tetronic 704 | 30 | 40:60 | 2.7 | 0.128 | 9 |
| 11 | Tetronic 702 | 10 | 20:80 | 2.6 | 0.13 | 24 |
| 12 | Tetronic 704 | 10 | 40:60 | 2.6 | 0.128 | 9 |

EXAMPLE 13

This example illustrates the synthesis of a foam based on 4:1 phenol:o-cresol resole of the present invention.

| Item | Ingredient | grams |
|---|---|---|
| A | Resin C | 300 |
| B | CFCl$_3$ | 22.5 |
| C | CFCl$_2$CF$_2$Cl | 22.5 |
| D | Surfactant A of Example 4 | 15 |
| E | Catalyst B | 35 |

Items A through E are mixed in an open vessel for 15-20 seconds. The mixture is then poured into a square paper box twelve inches by twelve inches by five inches tall. A foaming reaction ensues. After a period of 300-400 seconds the material is rigid. The box and contents are placed in an oven at 55° to 75° C. for a period of ten minutes to one hour.

EXAMPLES 14-16

The procedure of Example 6 is repeated using different surfactants. The characteristics of the surfactant and resultant foam are shown in Table II.

A typical resultant foam has the following properties:

| | |
|---|---|
| Density | 2.2 lbs/ft$^3$ |
| Thermal Conductivity | 0.13 Btu/hr-° F-ft$^2$ per inch |
| Friability | 32% |
| Compressive Strength | 25 psi |
| Oxygen Index Value | 40 |

TABLE II
PROPERTIES OF PHENOLIC FOAMS MADE WITH 4:1 PHENOL:O-CRESOL BASED RESINS

| Example (No.) | Alkoxylated Amine | Copolymer Level (Wt. %) | Ratio p:q | Density (lb/ft$^3$) | Initial k (Btu/hr-° F-ft$^2$ per inch) | k drift dK dLogt ($\times 10^3$) | Catalyst B phr |
|---|---|---|---|---|---|---|---|
| 14 | Tetronic 704 | 20 | 40:60 | 2.2 | 0.13 | 9 | 11.7 |
| 15 | Tetronic 704 | 20 | 40:60 | 2.3 | 0.13 | 5 | 13.3 |
| 16 | Tetronic 702 | 20 | 20:80 | 2.3 | 0.12 | 5 | 11.7 |

Although the invention has been described in considerable detail with reference to certain preferred embodiments thereof, it will be understood that variations and modifications can be effected within the spirit and scope of the invention as described above and as defined in the appended claims.

What is claimed is:

1. A closed cell foam material comprising the reaction product of:
   A. phenolic-resin foam forming reactants,
   B. a blowing agent,
   C. a surfactant which is the reaction product of:
      I. an alkoxylated amine of Formula VI

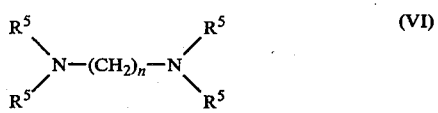

wherein:
(a) $R^5$ is an alkoxylated chain of Formula VII, having terminal hydroxyl groups,

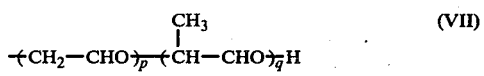

(b) n is an integer from 2 to 10 inclusive,
(c) the ratio p:q is 15:85 to 85:15 with
II. a copolymerizable mixture of dialkyl maleate and a member selected from the group consisting of N-vinyl-2-pyrrolidone and N-vinyl caprolactam, and
III. a capping agent for the terminal hydroxyl groups.

2. The closed cell foam material of claim 1 wherein the phenolic resin foam forming reactants comprise phenol and an ortho-cresol-phenol block copolymer.

3. The closed cell foam material of claim 2 wherein the ratio of phenol to ortho-cresol in the phenolic resin is 1:1.5 to 10:1.

4. The closed cell foam material of claim 1 wherein the capping agent is acetic anhydride.

5. The closed cell foam material of claim 1 wherein the surfactant has a hydroxyl value of less than 50.

6. The closed cell foam material of claim 1 wherein the blowing agent is present in an amount sufficient to give the resultant foam a density of 0.5 to 10 pounds per cubic foot.

7. The closed cell foam material of claim 1 wherein the blowing agent comprises 1 to 30 weight percent of the foam material.

8. The closed cell foam material of claim 1 wherein the surfactant comprises from 0.05 to 10 weight percent of the foam material.

9. The closed cell foam material of claim 1 wherein the alkoxylated amine has a molecular weight between 1500 and 6000.

10. The closed cell foam material of claim 1 wherein the copolymerizable mixture comprises 5 to 40 weight percent based on the weight of the surfactant.

11. The closed cell foam material of claim 1 wherein the alkyl of the dialkyl maleate has 1 to 5 carbon atoms.

12. A closed cell foam material comprising the reaction product of:
A. an alkylol group containing phenolic polymer of Formula I

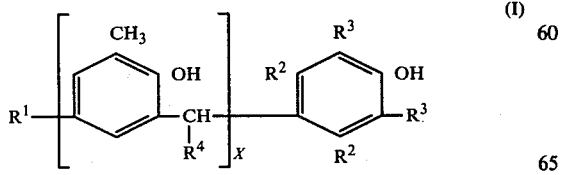

wherein:
(a) $R^1$ is

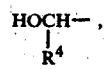

hydrogen, or a radical of Formula II,

(b) the $R^2$'s are independently selected from the group consisting of lower alkyl, phenyl, benzyl, halo, nitro and hydrogen,
(c) the $R^3$'s are independently selected from the group consisting of

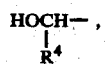

hydrogen, and a radical of Formula II,
(d) the $R^4$'s are independently selected from the group consisting of lower alkyl, hydrogen, phenyl, benzyl, and furyl,
(e) x is an integer from 2 to 10 inclusive,
(f) the phenolic polymer has a molecular weight between 200 and 2000,
B. a compound of Formula V

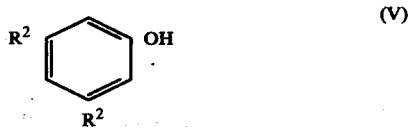

wherein the weight ratio of B:A is 1:30 to 1:2,
C. a blowing agent in a minor amount sufficient to foam the reaction mixture, and
D. a surfactant which is the reaction product of
I. an alkoxylated amine of Formula VI

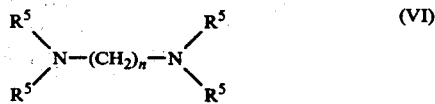

wherein:
(a) $R^5$ is an alkoxylated chain of Formula VII, having terminal hydroxyl groups,

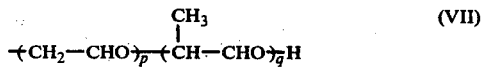

(b) n is an integer from 2 to 10 inclusive,
(c) the ratio p:q is 15:85 to 85:15,
(d) the molecular weight of the alkoxylated amine is 1500 to 6000, and
II. a copolymerizable mixture of dialkyl maleate and a member selected from the group consisting of N-vinyl-2-pyrrolidone and N-vinyl caprolactam,
III. a capping agent for the terminal hydroxyl groups selected from the group consisting of acetic acid, acetic anhydride, acetyl chloride, and 3,5-dinitrobenzoyl chloride, so that the surfactant has a hydroxyl value less than 10.

13. A closed cell foam material comprising the reaction product of:

A. a methylol group containing phenolic polymer of Formula III

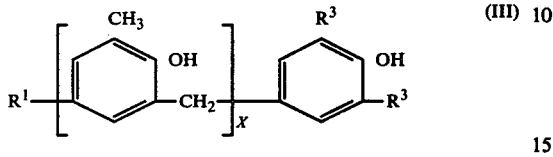

wherein:
(a) $R^1$ is $HOCH_2-$, hydrogen or a radical of Formula IV,

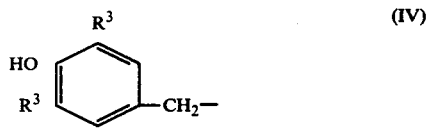

(b) the $R^3$'s are independently selected from the group consisting of $HOCH_2-$, hydrogen and a radical of Formula IV,
(c) x is an integer from 3 to 6 inclusive,
(d) the phenolic polymer has a molecular weight between 300 and 1500, B. phenol, wherein the weight ratio of B:A is 1:20 to 1:5, C. a blowing agent in a minor amount sufficient to foam the reaction mixture, D. a surfactant which is the reaction product of:
I. an alkoxylated amine of Formula VI

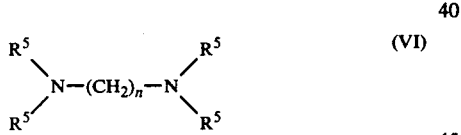

wherein:
(a) $R^5$ is an alkoxylated chain of Formula VII,

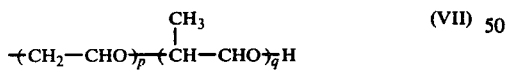

(b) n is an integer from 2 to 10 inclusive,
(c) the ratio p:q is 20:80 to 60:40,
(d) the molecular weight of the alkoxylated amine is 1800 to 2800, II. a copolymerizable mixture of dibutyl maleate and N-vinyl-2-pyrrolidone wherein the copolymerizable mixture comprises 20 weight percent based on the weight of the reaction product, and the molar ratio of dibutyl maleate to N-vinyl-2-pyrrolidone is 1:1, III. acetic anhydride, wherein the surfactant has a hydroxyl value less than 10.

14. A process for producing a closed cell foam material, said process comprising reacting phenolic-resin foam forming reactants in the presence of a blowing agent and a surfactant which is the reaction product of:
I. an alkoxylated amine of Formula VI

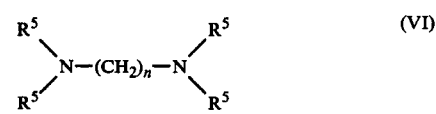

wherein:
(a) $R^5$ is an alkoxylated chain of Formula VII, having terminal hydroxyl groups,

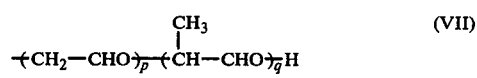

(b) n is an integer from 2 to 10 inclusive,
(c) the ratio p:q is 15:85 to 85:15 with II. a copolymerizable mixture of dialkyl maleate and a member selected from the group consisting of N-vinyl-2-pyrrolidone and N-vinyl caprolactam, and III. a capping agent for the terminal hydroxyl groups.

15. A process for producing a closed cell foam material, said process comprising reacting phenolic-resin foam forming reactants in the presence of a blowing agent and a surfactant which is the reaction product of:
I. an alkoxylated amine of Formula VI

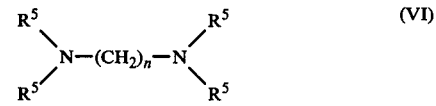

wherein:
(a) $R^5$ is an alkoxylated chain of Formula VII,

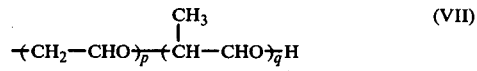

(b) n is an integer from 2 to 10 inclusive,
(c) the ratio p:q is 20:80 to 60:40,
(d) the molecular weight of the alkoxylated amine is 1800 to 2800, II. a copolymerizable mixture of dibutyl maleate and N-vinyl-2-pyrrolidone wherein the copolymerizable mixture comprises 20 weight percent based on the weight of the reaction product, and the molar ratio of dibutyl maleate to N-vinyl-2-pyrrolidone is 1:1, III. acetic anhydride, wherein the surfactant has a hydroxyl value less than 10.

* * * * *